May 14, 1968

C. J. ROSSI ET AL 3,383,255

PLANAR ETCHING OF FUSED SILICA

Filed Nov. 5, 1964

INVENTORS
KURT H. NELSON
FREDERICK S. KAVEGGIA
BY CARL J. ROSSI

ATTORNEY

INVENTOR.
KURT H. NELSON
FREDERICK S. KAVEGGIA
BY CARL J. ROSSI

ATTORNEY

May 14, 1968  C. J. ROSSI ET AL  3,383,255
PLANAR ETCHING OF FUSED SILICA

Filed Nov. 5, 1964  3 Sheets-Sheet 3

INVENTORS
KURT H. NELSON
FREDERICK S. KAVEGGIA
BY CARL J. ROSSI

Vincent H Cleary
ATTORNEY

United States Patent Office 3,383,255
Patented May 14, 1968

3,383,255
PLANAR ETCHING OF FUSED SILICA
Carl J. Rossi, Orange, Frederick S. Kaveggia, Beverly Hills, and Kurt H. Nelson, Canoga Park, Calif., assignors to North American Rockwell Corporation, a corporation of Delaware
Filed Nov. 5, 1964, Ser. No. 409,264
6 Claims. (Cl. 156—17)

ABSTRACT OF THE DISCLOSURE

A process for planar etching silicon dioxide comprising immersing the silicon dioxide in a solution of hydrofluoric acid, phosphoric acid, and a fluorinated wetting agent in sufficient quantity to lower the surface tension of the solution to 15 dynes/cm. or less. Relative motion is provided between the solution and the silicon dioxide to assist in the removal of the by-products of the etching reaction.

---

The present invention relates to a method for etching and more specifically to a method for etching silicon dioxide ($SiO_2$).

Silicon dioxide, either single crystal, or amorphous (fused silica), has highly desirable properties for use in measuring instruments. However, in many applications, it is necessary that the materials be etched "optically flat" for the instruments.

Therefore, an object of the invention is to provide a method for producing an optically flat surface.

Another object of the invention is the provision of a method for etching silicon dioxide.

A still further object of the invention is to provide a method that will etch an optically flat surface on silicon dioxide.

In the present invention, a solution of hydrofluoric acid, water, phosphoric acid and a wetting agent are employed in predetermined amounts as an etchant. The silicon dioxide (either single crystal, or amorphous (fused silica)) is placed in the solution and while in the solution continuous relative movement is effected between the etchant and the silicon dioxide. The silicon dioxide is kept in the solution with continuous relative movement with the solution for a predetermined time depending upon the depth of the etch desired. It has been discovered that utilizing all these elements and with the continuous movement an optically flat surface is obtained on the silicon dioxide.

Other objects and advantages of the invention will be realized with the reading of the specification taken in conjunction with the drawings in which.

Figure 1:
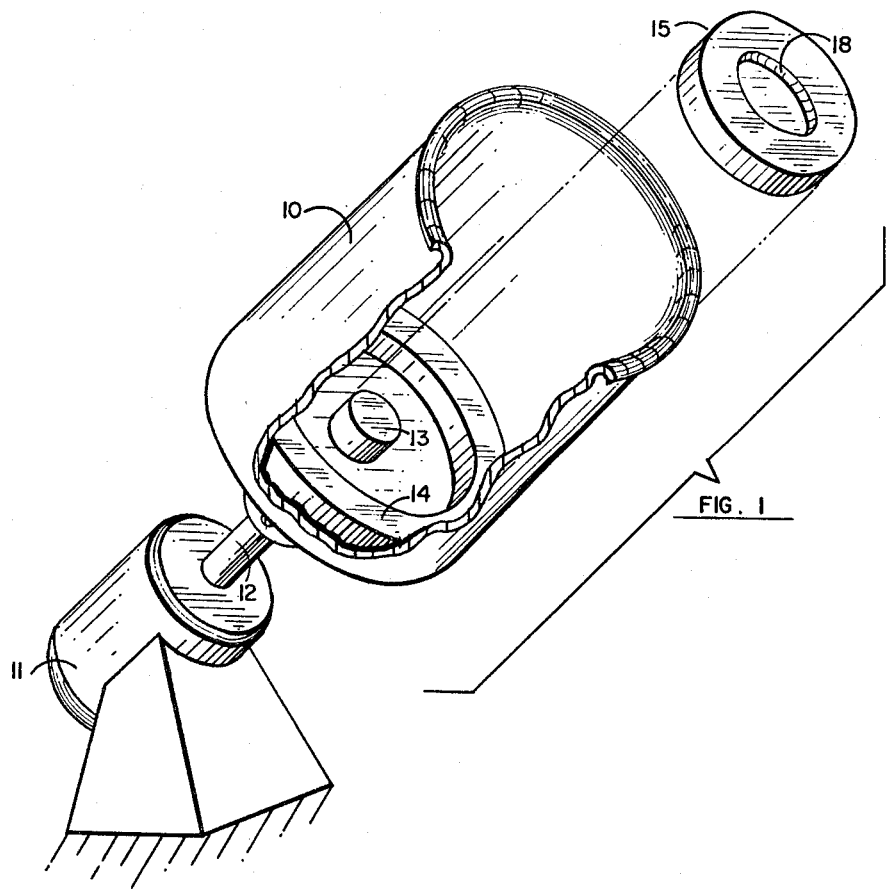
FIG. 1 illustrates an isometric view partially broken away of an etching apparatus employed in the embodiment of the invention.
Figure 2:
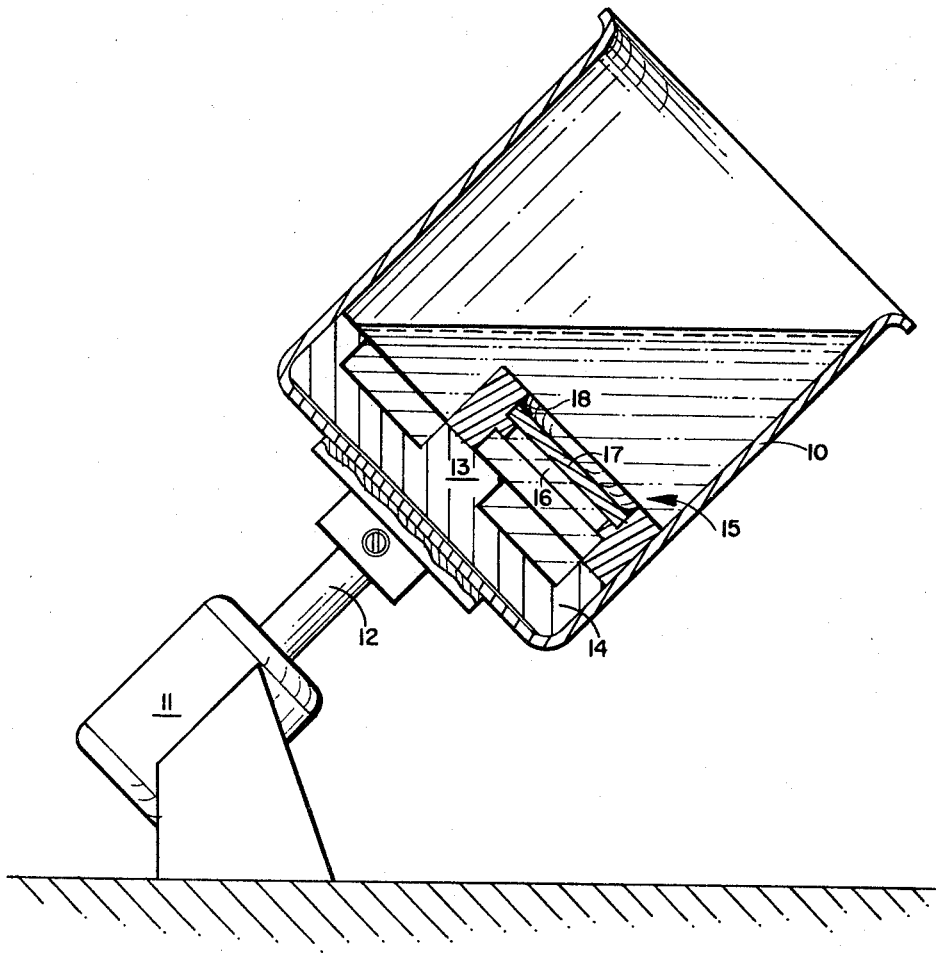
FIG. 2 illustrates a cross-sectional view of the etching apparatus shown in FIG. 1.

FIGS. 1 and 2 illustrate the apparatus employed in the etching methods of the present invention. As shown, a beaker 10 is employed which is mounted for rotation on a shaft 12 of a motor 11. The inner side of beaker 10 has a central cylindrical post 13 and an outer circular flange 14. In this method, the silicon dioxide disc 17 is mounted in a ring member 15. Ring member 15 employs, as shown in FIGS. 1 and 2, circular flange 16 for supporting quartz disc 17. The outer side of disc 17 then is secured by wax 18. As shown in FIG. 2, when ring member 15 is placed in beaker 10, one side of ring 15 rests on center post 13 while the other side rests on rim 14. The purpose of post 14 and ring 15 is to enable etching of disc 17 on both sides. In the tests employed below, the inside diameter of beaker 10 was 6 inches and the outside diameter of ring 15 was 3 inches. The etching solution to be described below came to the approximate level as shown in FIG. 2. With this size of beaker, the speed was kept at approximately 33 revolutions per minute for the samples shown in Tables I and II below. This resulted in a 66 revolutions per minute speed of ring 15 and disc 17. The material inside beaker 10 as well as ridge 14 and post 13 may be made of Teflon. In addition, sufficient friction was obtained to provide a near direct drive between ring 15 and the inner sides of beaker 10. Consequently, the speed can be on the basis of direct drive. Other samples other than those listed below were satisfactorily produced with speeds from 15 to 45 revolutions per minute of beaker 10 (30 to 90 revolutions per minute of disc 17) depending on the concentration of the hydrofluoric acid.

The effect of various speeds was found to do solely with uniformity of etching. If the speed is too high, ripples occur which provide uneven etching and if the speed is too slow, the material etched from disc 17 is not removed fast enough from the surface being etched so as to result in uneven etching. With both these outer speed limits, an optically flat surface will not be produced.

As stated above and as shown in the tables below, various proportions of hydrofluoric acid and phosphoric acid ($H_3PO_4$) were employed. In addition and in order to obtain an optically flat etch, a wetting agent was employed to substantially reduce the surface tension of the phosphoric acid. The wetting agent should preferably be a highly halogenated acid resistant hydrocarbon. The specific wetting agent employed in the tests shown in Tables I and II was

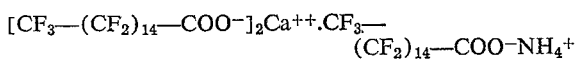

was also found to give good results as the wetting agent in the etchants for the process embodying the invention described below. In addition

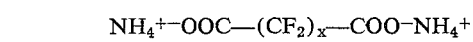

was found to give good results as the wetting agent in the etchant for the process embodying the invention end described below.

The temperature of all the tests was 70 degrees Fahrenheit at atmospheric pressure so that the hydrofluoric acid would not vaporize and also to reduce the speed of etching. Etching at a high temperature would increase the speed of etching; however, this temperature should be kept below the temperature at which HF will distill (about 140 degrees Fahrenheit). Etching done below 70 degrees Fahrenheit will have a slower etching rate; however, etching can be done between 30 degrees Fahrenheit and 140 degrees Fahrenheit at atmospheric pressure.

In a preferred embodiment of the invention, an etchant was prepared consisting of hydrofluoric acid, phosphoric acid, a wetting agent and water. The hydrofluoric acid was hydrofluoric acid (70 percent) which is 70 percent by weight of hydrogen fluoride and 30 percent by weight of water. The phosphoric acid was phosphoric acid (85%) which is 85 percent by weight of $H_3PO_4$ and 15 percent by weight of water. In this embodiment, the etchant was prepared including 6.12 percent by weight of hydrofluoric acid (70%), 69.50 percent by weight of phosphoric acid (85%), .014 percent by weight of

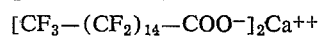

a highly fluorinated wetting agent and water to 100 percent. The wetting agent was added to the phosphoric acid and stirred for 24 hours at room temperature. This resulted in the phosphoric acid having a surface tension of 14 dynes/cm. The hydrofluoric acid and water sufficient to make 100 percent were then added to the phosphoric acid. The solution was placed in beaker 10. A fused silica disc was placed as shown in FIG. 2 in mounting ring 15. The major surfaces of the disc were optically flat by mechanical lapping. This disc was 1.675 inches in diameter and 0.250 inch thick. Beaker 10 was rotated 33 revolutions per minute to provide a rotary speed to the disc of 66 revolutions per minute. This rotation was continued for three hours so as to etch down the disc 850 microinches. The fused silica disc was then removed from ring 15 and immediately the residue of the etchant was removed from the fused silica disc by vapor degreasing using trichlorethylene. As a result of this process which was all done at 70 degrees Fahrenheit, optically flat surfaces were obtained.

As a test a fused silica disc was provided wherein 7 windows were individually masked and etched in accordance with the Table I below. That is, the whole disc except one of the windows was masked with a photoresist mask. These windows are identified as A, B, C, D, E, F, and G in Table I. Tables I and II illustrate the etchant of depth of etch versus etching time. This was obtained from windows B, C and G of Table I.

Figure 3:
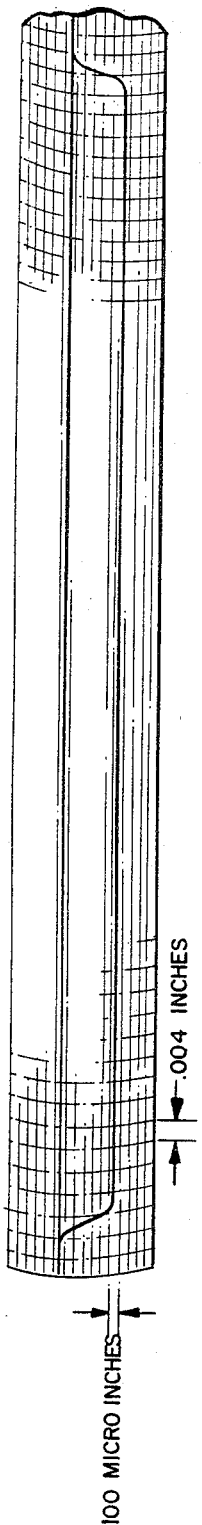
FIG. 3 illustrates a tracing obtained from the profile of an etched window.

TABLE I.—ETCHING DATA FOR WINDOWS IN FIG. 3
[Percentage by weight]

| Window | Hydrofluoric Acid (70%) to Water | Phosphoric acid (85%) Percent | Surface Tension of Phosphoric Acid, dynes/cm. | Rotation (66 r.p.m.) | Time, minutes |
|---|---|---|---|---|---|
| D | 6.12% to 100% | 69.50 | 14 | None | 60 |
| F | 6.12% to 100% | 69.50 | 74 | Yes | 60 |
| A | 14.56% to 100% | 60.63 | 14 | Yes | 60 |
| E | 21.65% to 100% | 52.56 | 14 | Yes | 60 |
| B | 6.12% to 100% | 69.50 | 14 | Yes | 120 |
| C | 6.12% to 100% | 69.50 | 14 | Yes | 135 |
| G | 6.12% to 100% | 69.50 | 14 | Yes | 180 |

Window D was not rotated during etching and as a result was not optically flat. Window F was rotated in a solution containing 6.12 percent hydrofluoric acid, 69.5 percent phosphoric acid and the remainder water. However, there was no wetting agent employed to reduce the surface tension of the phosphoric acid. As a result, window F was also not optically flat.

Observation under polarized light indicated that windows B, C, and G exhibited optically flat etched recesses. The profile of window C was recorded on a "Proficorder" of Micrometrical Manufacturing Company, Ann Arbor, Mich., the results of which are illustrated in FIG. 3. In this graph, each vertical section is 100 microinches of dept whereas the horizontal sections are .004 inch. Thus, by this measurement, further proof of the optically flat recesses achieved is shown. The top horizontal line was obtained before etching and the bottom line after etching.

In addition to the above tests, optically flat windows on fused silica were etched by the three samples in Table II below. 1.7 percent by weight of

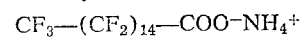

$$CF_3-(CF_2)_{14}-COO^-NH_4^+$$

was used as the wetting agent. After etching each window was water rinsed and then vapor degreased with trichloroethylene.

TABLE II
[Percentage by weight]

| Depth of Etch, microinches | Hydrofluoric Acid (70%) to Water | Phosphoric Acid (85%) | Surface Tension of Phosphoric Acid, dynes/cm. | Rotation (66 r.p.m.) | Time, minutes |
|---|---|---|---|---|---|
| 9.2 | 0.078% to 100% | 84.71 | 14 | Yes | 50 |
| 1.05 | 0.58% to 100% | 73.48 | 14 | Yes | 1 |
| 246. | 0.58% to 100% | 73.48 | 14 | Yes | 30 | employed, the rotation speed of the disc as well as the time the disc was emersed in the etchant.

The rotation speed in Tables I and II (if rotated) was 33 revolutions per minute of the beaker as shown in FIGS. 1 and 2 (66 revolutions per minute of the fused silica disc). The disc employed was fused silica. The percentages listed are by weight. The hydrofluoric acid was hydrofluoric acid (70%) described above, and the phosphoric acid was phosphoric acid (85%) described above. .014% by weight of the wetting agent

Figure 4:
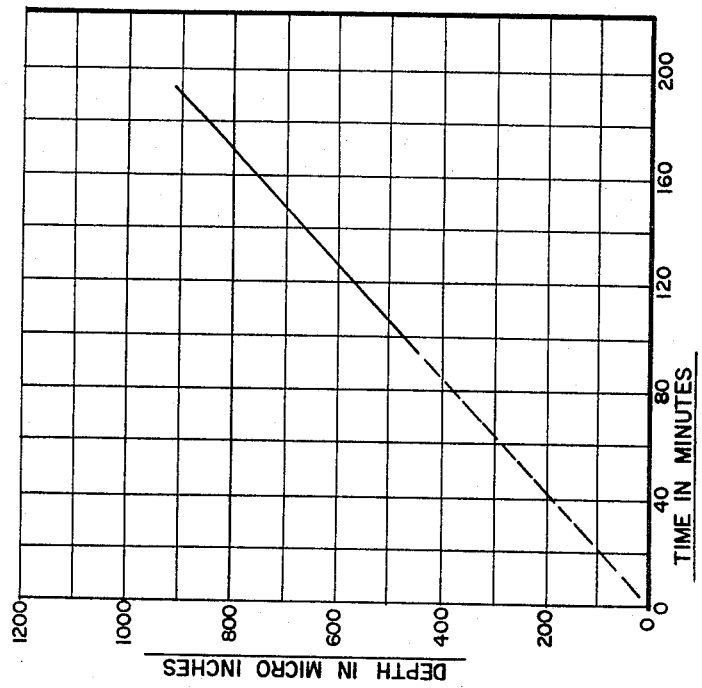
FIG. 4 is a graph of the etching action of an embodiment of the invention.

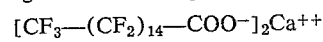

$$[CF_3-(CF_2)_{14}-COO^-]_2Ca^{++}$$

was in all etchants except the etchant for window F. This was sufficient to lower the surface tension of the phosphoric acid to 14 dynes/cm. when stirred with the phosphoric acid for 24 hours. Subsequently, the hydrofluoric acid and water were added. After each window was etched, it was cleaned by vapor degreasing using trichloroethylene. After all the windows were etched, the test disc was placed on an optical flat. Polarized light from a monochromatic tellurium light source was directed on the disc to produce interference lines. FIG. 4 is a graph It can be seen from Table I that neither rotation nor the lowering of the surface tension separately would produce an optically flat surface; however, the combination of both of these did give an optically flat surface.

The original fused silica disc used for the foregoing tests was 1.675 inches in diameter and 0.250 inch thick. One edge of the quartz disc was damaged due to improper handling of the piece by the supplier. The initial surface of the disc was made optically flat by mechanical lapping.

The depth of etching obtained on each window, B, C, and G was: B, 575 microinches; C, 625 microinches; and G, 850 microinches. FIG. 4 graphically illustrates these results. All measurements were to within ±10 microinches. Windows B, C, and G were each shown to be optically flat and of uniform depth.

Although the invention has been described and illustrated in detail, it is to be clearly understood that the same is by way of illustration and example only and is not to be taken by way of limitation, the spirit and scope of this invention being limited only by the terms of the appended claims.

We claim:

1. The process of planar etching silicon dioxide comprising subjecting the silicon dioxide to the etching action of a solution of hydrofluoric acid, phosphoric acid, and a non-buffering wetting agent in sufficient quantity to substantially lower the surface tension of said solution, and providing relative movement between the solution and the silicon dioxide.

2. The process of planar etching silicon dioxide comprising immersing the silicon dioxide in an etching solution of between 0.1 to 50 percent by weight of hydrofluoric acid, 50 to 95 percent by volume of phosphoric acid, and a compatible wetting agent in sufficient quantity to lower the surface tension of said solution to less than 15 dynes/cm. and providing relative movement between the solution and the silicon dioxide.

3. The process of claim 1 wherein said wetting agent is a fluorinated wetting agent.

4. The process of claim 3 wherein the quantity of wetting agent is sufficient to lower the surface tension of said solution to less than 15 dynes/cm.

5. The process of claim 1 wherein the quantity of wetting agent is sufficient to lower the surface tension of said solution to 15 dynes/cm. or less.

6. The process of planar etching silicon dioxide comprising immersing the silicon dioxide in a solution of hydrofluoric acid, phosphoric acid, and a wetting agent in sufficient quantity to lower the surface tension of said solution to less than 15 dynes/cm., and providing relative motion between said solution and said silicon dioxide.

References Cited

UNITED STATES PATENTS

| | | | |
|---|---|---|---|
| 3,219,712 | 11/1965 | Hauptschein et al. | 260—653.1 |
| 2,849,296 | 8/1958 | Certa | 156—17 |
| 3,107,188 | 10/1963 | Hancock | 156—17 |

JACOB H. STEINBERG, *Primary Examiner.*